(12) United States Patent
Macor

(10) Patent No.: US 6,919,864 B1
(45) Date of Patent: Jul. 19, 2005

(54) DISPLAY MONITOR

(75) Inventor: James J. Macor, Jackson, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 660 days.

(21) Appl. No.: 09/627,009

(22) Filed: Jul. 27, 2000

(51) Int. Cl.[7] ................................................. G09G 5/00
(52) U.S. Cl. ........................... 345/1.1; 345/1.3; 345/2.2; 345/169
(58) Field of Search ........................... 345/1.1, 1.2, 1.3, 345/2.2, 3.1, 156, 169, 901, 905

(56) References Cited

U.S. PATENT DOCUMENTS

| | | | | |
|---|---|---|---|---|
| 5,047,754 A | * | 9/1991 | Akatsuka et al. ............ 345/163 |
| 5,115,229 A | | 5/1992 | Shalit |
| 5,128,662 A | * | 7/1992 | Failla .......................... 345/1.3 |
| 5,179,648 A | | 1/1993 | Hauck |
| 5,467,102 A | * | 11/1995 | Kuno et al. ................... 345/1.3 |
| 5,583,744 A | * | 12/1996 | Oguchi et al. ............... 361/683 |
| 5,589,849 A | * | 12/1996 | Ditzik ......................... 361/681 |
| 5,673,170 A | * | 9/1997 | Register ...................... 361/681 |
| 5,687,939 A | * | 11/1997 | Moscovitch ............. 248/122.1 |
| 5,805,415 A | * | 9/1998 | Tran et al. ................... 361/681 |
| 5,847,698 A | * | 12/1998 | Reavey et al. ............... 345/173 |
| 5,889,602 A | * | 3/1999 | Johnson et al. ............. 398/131 |
| 5,904,328 A | * | 5/1999 | Leveridge et al. ........ 248/124.1 |
| 5,909,315 A | | 6/1999 | Keehn |
| 5,923,307 A | * | 7/1999 | Hogle, IV ....................... 345/4 |
| 5,926,165 A | * | 7/1999 | Grewer et al. ............... 345/800 |
| 5,949,643 A | * | 9/1999 | Batio .......................... 361/681 |
| 6,031,178 A | * | 2/2000 | Kester ......................... 136/245 |
| 6,084,553 A | * | 7/2000 | Walls et al. ................. 345/781 |
| 6,137,490 A | * | 10/2000 | Shishido ..................... 345/690 |
| 6,163,451 A | * | 12/2000 | Chiu ........................... 361/681 |
| 6,191,938 B1 | * | 2/2001 | Ohgami et al. ............. 361/681 |
| 6,212,068 B1 | * | 4/2001 | Rooyakkers et al. ........ 361/681 |
| 6,215,459 B1 | * | 4/2001 | Reddy et al. ................. 345/3.1 |
| 6,222,507 B1 | * | 4/2001 | Gouko ......................... 345/1.1 |
| 6,262,824 B1 | * | 7/2001 | Sasaki et al. ............... 398/115 |
| 6,297,945 B1 | * | 10/2001 | Yamamoto .................. 361/681 |
| 6,302,612 B1 | * | 10/2001 | Fowler et al. ................ 403/76 |
| 6,313,828 B1 | * | 11/2001 | Chombo ..................... 345/169 |
| 6,343,006 B1 | * | 1/2002 | Moscovitch et al. ........ 361/681 |
| 6,381,125 B1 | * | 4/2002 | Mizoguchi et al. ......... 361/682 |
| 6,545,669 B1 | * | 4/2003 | Kinawi et al. .............. 345/173 |
| 6,587,082 B1 | * | 7/2003 | Moore ........................ 345/1.3 |

OTHER PUBLICATIONS

Robert Cowart, Mastering Windows 3.1, 1992, SYBEX Inc. pp. 66–67, 656–657, 694–695.*

* cited by examiner

Primary Examiner—Guy J. Lamarre
Assistant Examiner—Fritz Alphonse
(74) Attorney, Agent, or Firm—Birch, Stewart, Kolasch & Birch, LLP

(57) ABSTRACT

A computer monitor and computer system are described having multiple integrated display screens to allow for multi-tasking without any overlapping of images. The computer monitor includes a primary display platform, having a monitor screen, and at least one auxiliary display platform electrically and physically connected with said primary display platform. A hinge allows the display platforms to rotate relative to one another. The auxiliary display platform can rotate to a dosed position, covering the monitor screens of both display platforms. An activation/deactivation mechanism may be included on the monitor so that rotation to a closed position can deactivate the display monitors and rotation to an opened position can enliven the display monitors.

39 Claims, 7 Drawing Sheets

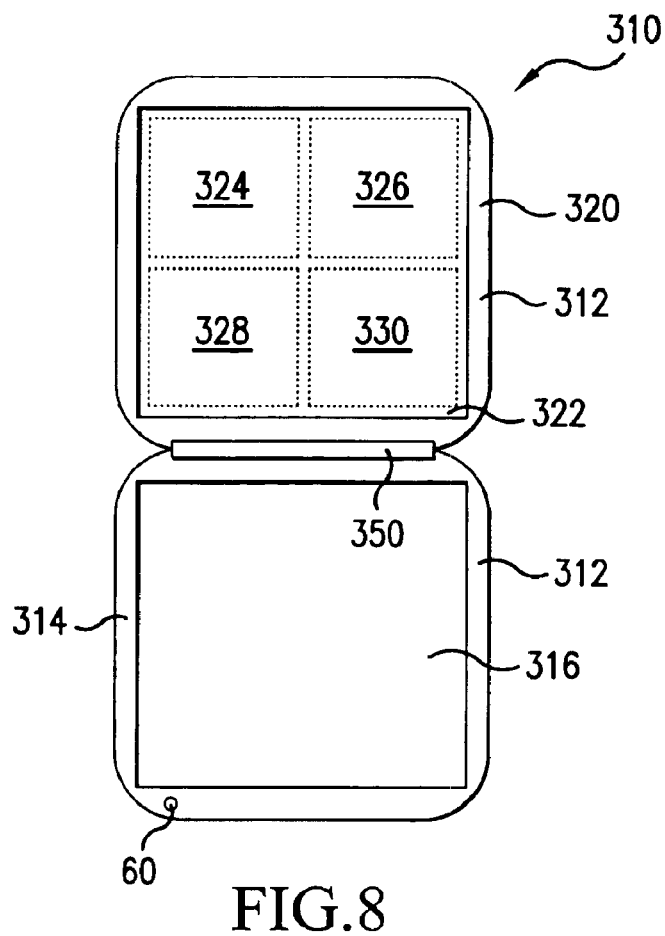
FIG.8
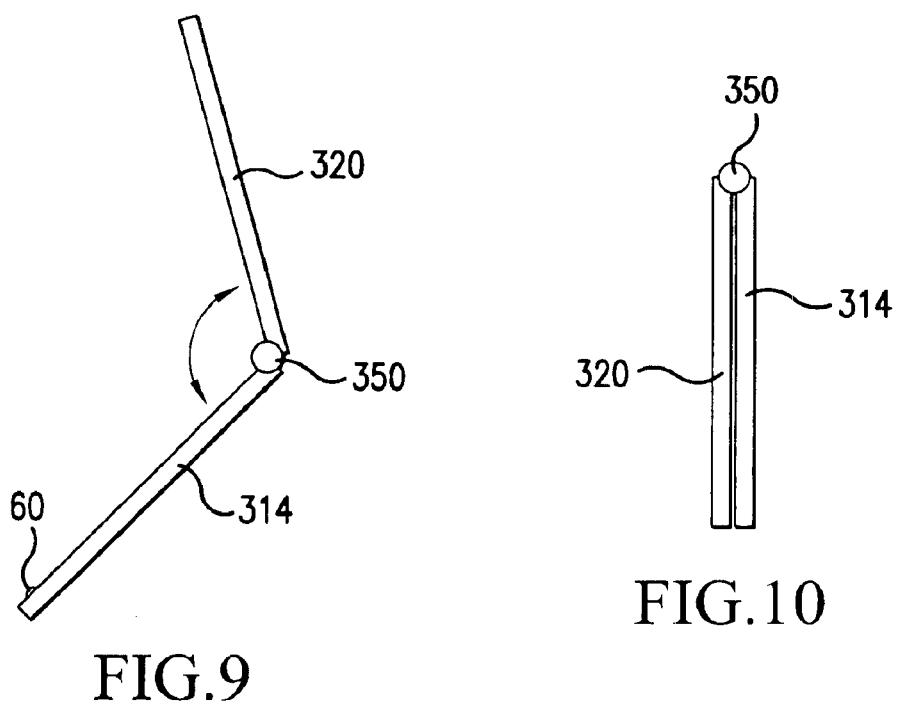
FIG.9
FIG.10

US 6,919,864 B1

DISPLAY MONITOR

FIELD OF THE INVENTION

The present invention relates generally to the display of information, and more particularly to a system of integrated multiple display platforms.

BACKGROUND

The use of desk top, laptop and other similar computers in daily life, both personal and business, has achieved a level such that the use is considered commonplace. Computers are now vital tools used in business to accomplish a wide array of tasks. Human interaction with computers continues to rise and the number of people owning and/or using computers is at an all time high and still increasing. Further, some functions which until recently were strictly performed by traditional computer systems are now being accomplished on telecommunication devices, such as, for example, wireless telephones.

Typically, a computer monitor includes a visual display of a variety of icons/pull down screens, computer programs, electronic mail systems, internet connection sites and others. A typical user, or operator, will multi-task between these desktop items, often interacting with several computer windows contemporaneously on the display.

Conventional monitors, however, are limited in the two-dimensional display space available for a user to multi-task among desktop items. Consequently, opened desktop items often are stacked one upon another, sometimes leading to a confusing and circuitous route from one opened desktop item to another, thus reducing the efficiency of the operator's work performance.

Alternatively, some users have connected two or more computer monitors up to address the lack of two-dimensional space for desktop items. Separate computer monitors, while addressing the issue of space for desktop items, creates a problem in that they take up additional physical space on one's desk or in one's home or office.

SUMMARY

The invention provides a computer monitor apparatus which includes a primary display platform having a display screen, and at least one auxiliary display platform having a display screen. The auxiliary display platform is rotatably connected to the primary display platform and is adapted to rotate from a closed position to an opened position.

In one aspect, the auxiliary display platform is sized and shaped to cover the display screen of the primary display platform in the closed position.

The invention further provides a computer system which includes a processing unit, a primary display platform, with a display screen, electrically connected with the processing unit, and at least one auxiliary display platform having a display screen and being rotatably connected to the primary display platform.

The invention also provides a telecommunications device that includes a primary display platform having a display screen, a hinge and an auxiliary display platform having a display screen rotatably connected to the primary display platform with the hinge. The auxiliary display platform is adapted to rotate from a closed position to an opened position and is sized and shaped to cover the display screen of the primary display platform in the closed position.

The invention also provides a method for displaying images on a computer monitor having at least two display platforms. The method includes displaying a first image on one of the display platforms, selecting a second image for display from the first image, displaying the selected second image on the other display platform, and sizing the opened second image in relation to the available display space on the other display platform to inhibit overlapping of the second image with other images being displayed on the other display platform.

The foregoing and other advantages and features of the invention will be more readily understood from the following detailed description of preferred embodiments, which is provided in connection with the accompanying drawings.

BRIEF DESCRIPTION OF THE DRAWINGS

FIG. 8 is a front view of a computer monitor constructed in accordance with another exemplary embodiment of the invention.

FIG. 9 is a side view of the computer monitor of FIG. 8 in an opened position.

FIG. 10 is a side view of the computer monitor of FIG. 8 in a closed position.

DETAILED DESCRIPTION OF PREFERRED EMBODIMENTS

Figure 1:
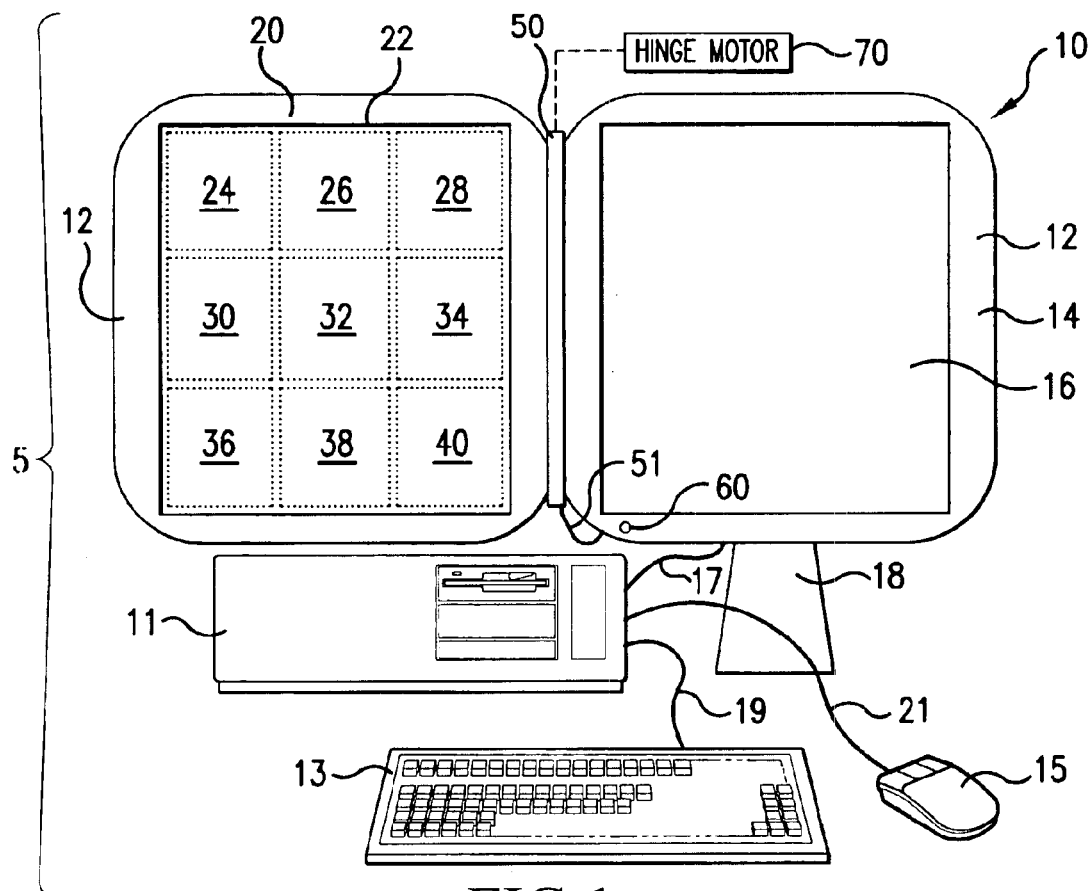
FIG. 1 is a front view of a computer system constructed in accordance with an exemplary embodiment of the invention.

FIG. 1 illustrates a desktop computer system 5 including a monitor 10, a desktop processing unit 11, a keyboard 13, and a mouse 15. The monitor 10, keyboard 13, and mouse 15 are each electrically connected to the processing unit 11 via, respectively, cables 17, 19, and 21. The desktop processing unit 11, keyboard 13, and mouse 15 are illustrated in FIG. 1 alone for simplicity of illustration.

The monitor 10 includes a visual display device 12 physically connected to a base 18. It is to be understood that the base 18 is shown schematically and can take any form.

For example, the base 18 may be sized and configured to allow the visual display device 12 to be mounted thereon. Instead, the base 18 may take the form of an articulated arm which connects to the visual display device 12. Alternatively, the base 18 may be a vertically adjustable platform upon which the visual display device 12 is positioned.

The visual display device 12 includes a primary display platform 14, having a first monitor screen 16, and an auxiliary display platform 20, having a second monitor screen 22. The shown display platforms 14, 20 are about the same size and configuration. The display platforms 14, 20 are connected together and movable relative to one another through a hollow hinge 50. The display platform 20 is further in electrical connection with the display platform 14 through a connector 51. The connector 51 may be an electrical cable snaked through the hinge 50. Alternatively, the connector 51 may be an optical connection device, such as a light pipe, through the hinge 50.

The second monitor screen 22 is enabled to display a plurality of images, shown schematically by boxes 24–40. When an operator activates the computer system 5, the primary image displaying desktop items will display on the first monitor screen 16. Upon the operator selecting one of the desktop items, thereby opening that item, the image of the selected item is displayed on the second monitor screen 22. The display of the selected item fills the entire extent of the screen 22 since no other desktop item has been selected. When a second desktop item is opened, it also is displayed on the screen 22. However, a software program which determines the amount of available screen space per each opened desktop item fits both of the opened desktop item images on the screen 22 such that each image is maximized in the available screen space.

Figure 2:
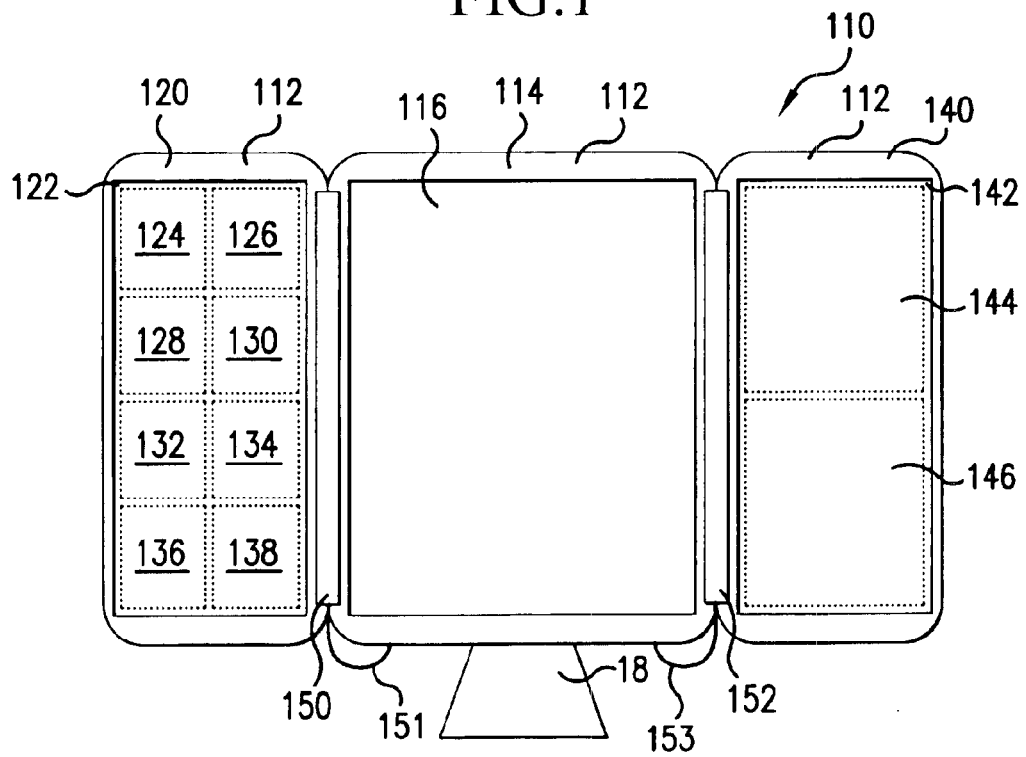
FIG. 2 is a front view of a computer monitor constructed in accordance with another exemplary embodiment of the invention.
Figure 3:
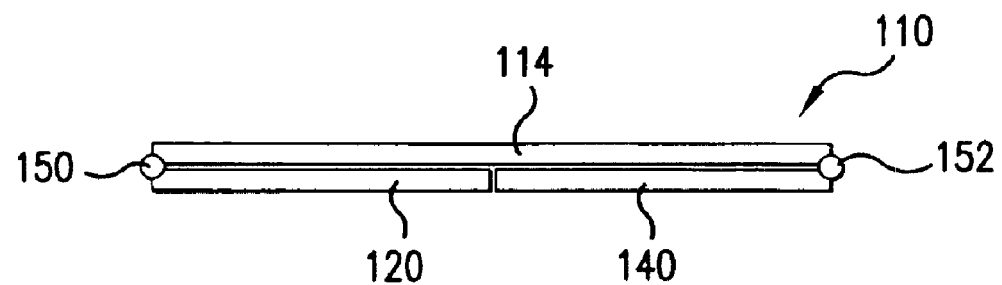
FIG. 3 is a top view of the computer monitor of FIG. 2 in a closed position.
Figure 4:
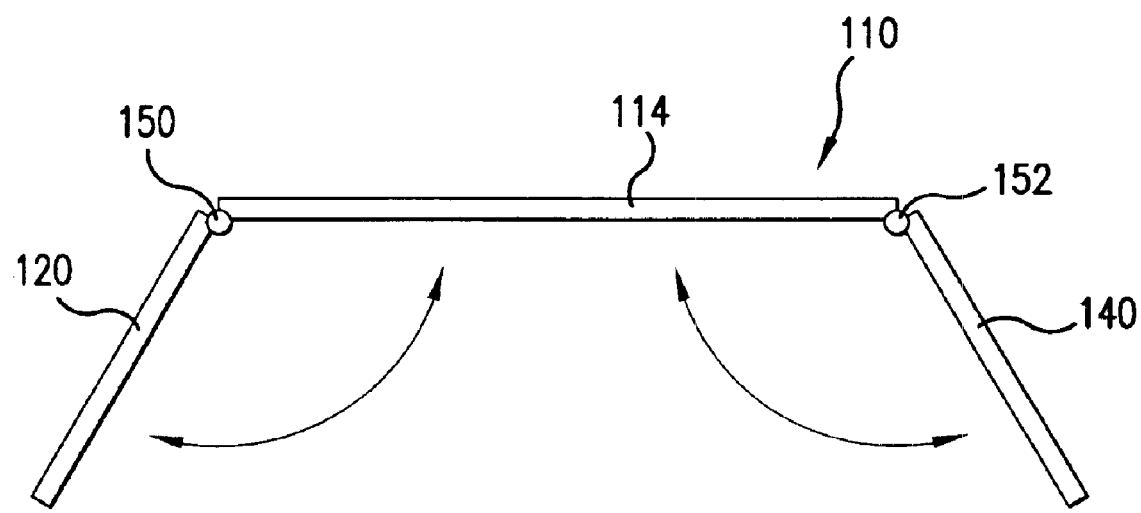
FIG. 4 is a top view of the computer monitor of FIG. 2 in an opened position.

FIGS. 2–4 illustrate a monitor 110 which includes a visual display device 112 having a primary display platform 114 flanked on either side by a first auxiliary platform 120 and a second auxiliary display platform 140. As shown, the auxiliary display platforms 120, 140 are each about half the size of the primary display platform 114. The auxiliary display platform 120 is rotatably connected to the primary display platform 114 through a hinge 150, and electrical connection between the two display platforms is via a connector 151. In like fashion, the auxiliary display platform 140 is rotatably connected to the primary display platform 114 via a hinge 152, and electrical connection is via a connector 153.

The primary display platform 114 includes a first monitor screen 116. The auxiliary display platform 120 includes a second monitor screen 122 and the auxiliary display platform 140 includes a third monitor screen 142. Each of the monitor screens 122, 142 is enabled to display a plurality of images. The second monitor screen 122 is shown with images illustrated schematically by boxes 124–138, while the third monitor screen 142 is shown with images illustrated schematically by boxes 144, 146.

The first monitor screen 114 displays a primary image including desk top items. When the operator opens up one of the desktop items, the image is transmitted to either the second monitor screen 122 (through the connector 151) or the third monitor screen 142 (through the connector 153). Since this image is the first one selected, the image takes up a maximum amount of the entire monitor screen 122 or 142.

When a second desktop item is opened, a software program either routes the second image to whichever monitor screen 112, 142 is not displaying an image, or fits the second image in the monitor screen 122 or 142 with the other displayed image such that each image is maximized in the available screen space. The software program calculates the total amount of available space to show an image and divides that amount by the number of images opened and to be displayed on a particular display platform to maximize the amount of space for each displayed image without overlapping any of the displayed images.

FIGS. 3 and 4 illustrate another feature of the monitor 110. The hinges 150, 152 allow rotatable movement of the auxiliary display platforms 120, 140 relative to the primary display platform 114. Specifically, the auxiliary display platforms 120, 140 are sized and configured to fold over the primary display platform 114, each platform 120, 140 taking up roughly one-half of the platform 114. The auxiliary display platforms 120, 140 also can rotate out to allow the operator to set these platforms at an appropriate angle, providing an ergonomic display of materials on the monitor 110. The hinges 150, 152 include a certain level of resistance so that the platforms 120, 140 remain in the position at which they are placed.

By closing the auxiliary display platforms 120, 140 over the primary display platform 114, all of the screens 116, 122 and 142 are protected from the elements, and the accumulation of dust on the screens is inhibited. The monitor 10 (FIG. 1) functions similarly, with the auxiliary display platform 20 enabled to fold over the primary display platform 14.

An additional feature provided is that the opening and closing of the auxiliary display platforms 120, 140 may enliven and shut-off, respectively, the display platforms 114, 120, 140. By opening one or both of the auxiliary display platforms 120, 140, a circuit may be closed, thus enlivening the auxiliary display platforms 114, 120, 140. The circuit may be closed and opened by closing and opening a switch, which may be electrical or optical in function (described in detail below). Again, the monitor 10 (FIG. 1) may likewise be activated and deactivated by opening and closing the auxiliary display platform 20.

Figure 14:
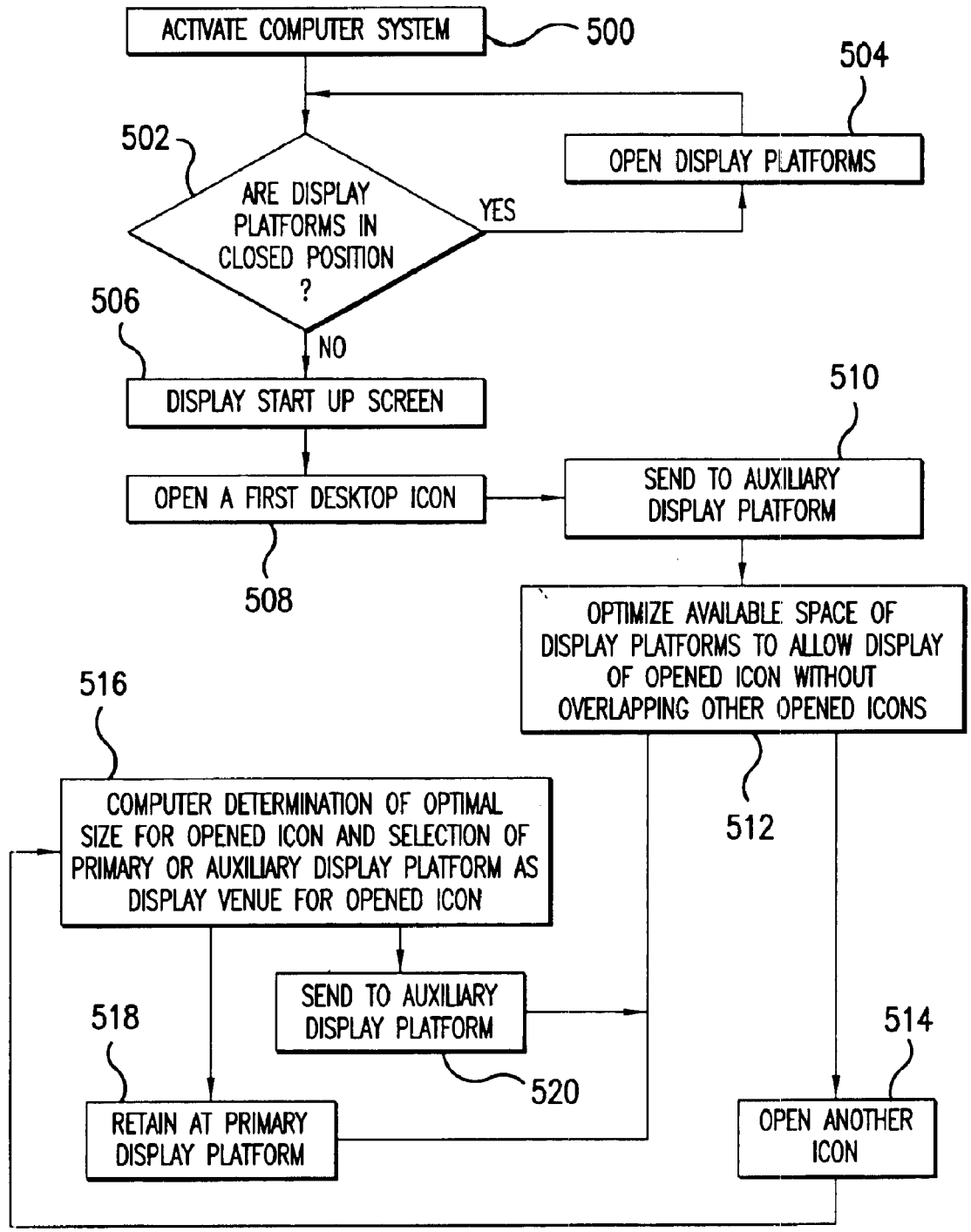
FIG. 14 is a flow diagram of a software utilized with the embodiments of the invention illustrated in FIGS. 1–13.

Referring to FIG. 14, the optimization of the sizes of displayed images will now be discussed with reference to the monitor 10 (FIG. 1). At step 500, the computer system 5 is activated. A determination is then made, at step 502, whether the display platforms 14, 20 are in the closed or opened position. If in the closed position, the program waits until the display platforms 14, 20 are opened at step 504. If in the opened position, a start up screen is displayed on the primary display platform 14 at step 506. A first desktop icon is opened by a user at step 508, and at step 510 the first opened desktop icon is transferred to the auxiliary display platform 20 for display on the display screen there. At step 512, the available space of the auxiliary display platform is optimized, allowing display of the opened icon without overlapping other opened icons.

Another desktop icon may be opened by a user at step 514. At step 516, the computer system 5 determines the optimal size for the just opened icon and selects either the primary or auxiliary display platforms 14, 20 as the display venue for the just opened icon, depending upon various factors including how many icons arc currently being displayed on each display platform.

The opened icon can either be retained at the primary display platform 14 at step 518, or the opened icon can be sent to the auxiliary display platform 14 at step 520. Whether the opened image is displayed on the primary display platform 14 or the auxiliary display platform 20, step 512 is operated and the available space of the display platform on which the image is opened is optimized, allowing display of the just opened icon without overlapping other opened icons.

Figure 5A:
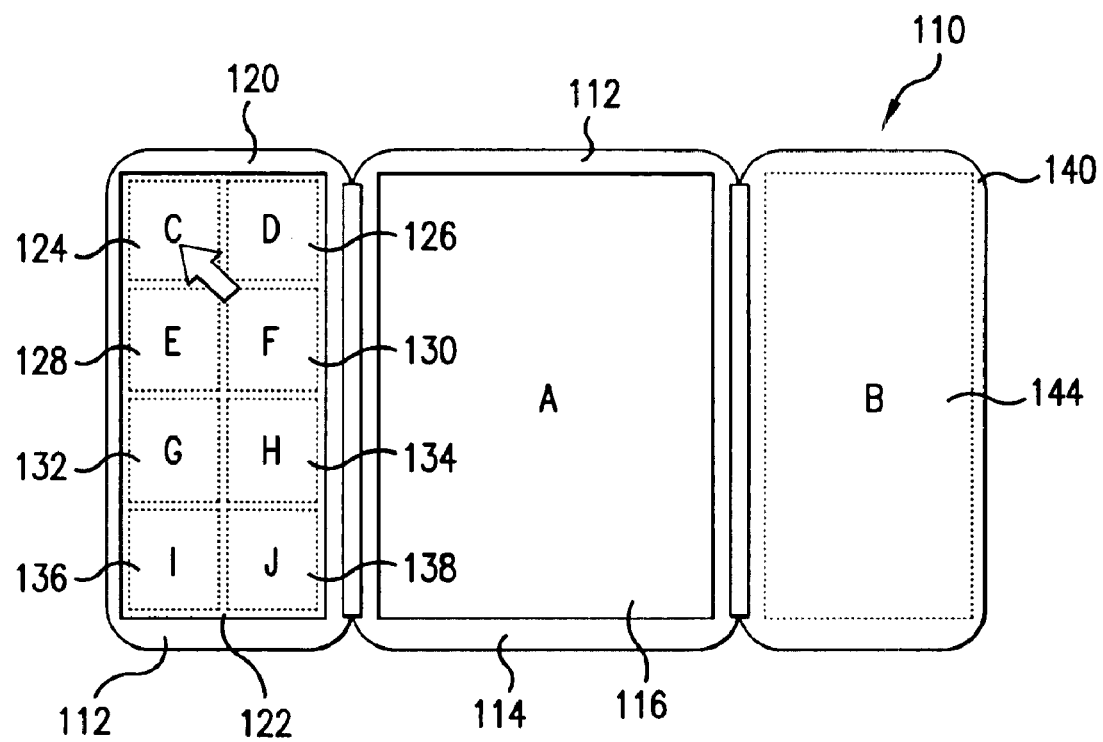
FIG. 5(A) is a front view of the computer monitor of FIG. 2.
Figure 5B:
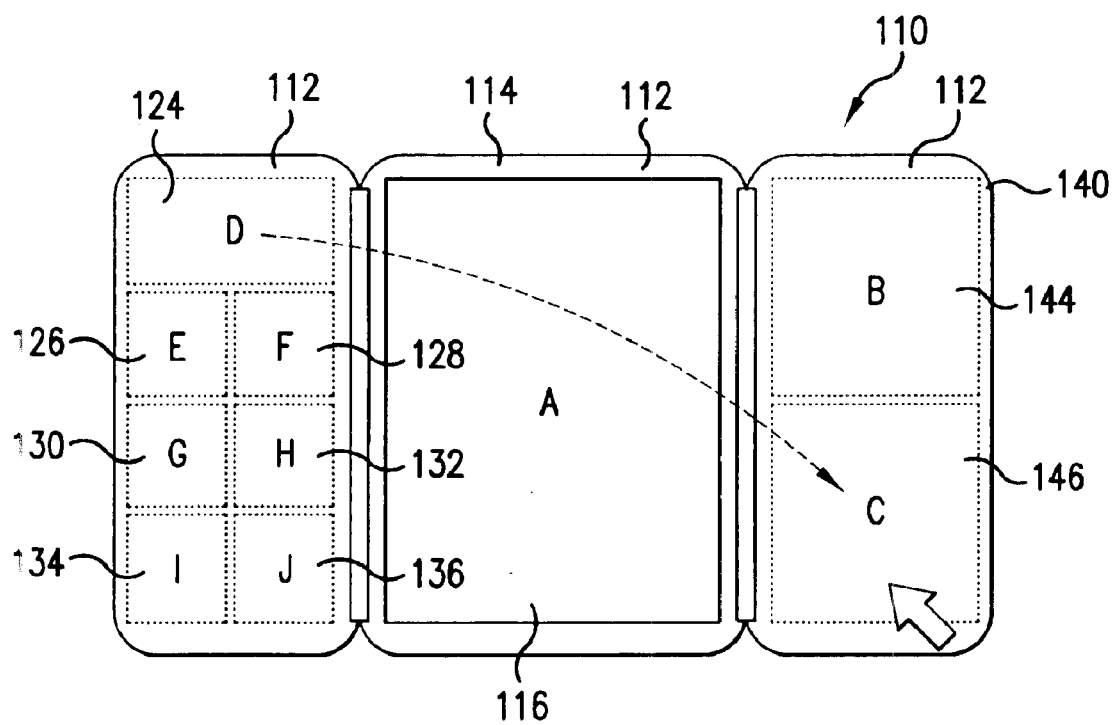
FIG. 5(B) is a front view of the computer monitor of FIG. 2.

With reference to FIGS. 5(A) and 5(B), the movement of images from one display platform to another will be discussed further. As shown in FIG. 5(A), a primary image A (for example, the screen depicting the desktop items) is visible on screen 116. Another image B takes up the screen 144, while images C through J take up equal portions of the screen 122 as images 124–138. To move an image to another display platform, for example, image C from the display platform 120 to the display platform 140, an operation must be performed to select the image C, which is positioned at certain coordinates within a pixel map of the display platform 120, and transfer it to a second location at a second set of coordinates within a pixel map of the display platform 140. This operation may be performed through the use of the mouse 15, the keyboard 13, a touch pad, voice activation software, or any other suitable mechanism for transferring the location of an image. If utilizing the mouse 15, the operator can click, or double click, on the image C. If clicking on image C, the operator then drags the image over to the display platform 140, also known as drag and drop. If double clicking on the image C the operator moves the cursor over to the display platform 140 and double clicks again.

Each display screen is made up of a finite number of pixels which are mapped. The mapping of the pixels allows the computer to translate the movement of an image to a movement between one area of pixels and another area of pixels. With the addition of auxiliary display platforms with auxiliary display screens, the pixel map may be increased in size to take into account the pixel areas found in the auxiliary display screens. Alternatively, redundant pixel maps which are keyed to the auxiliary display screens may be added to allow the computer to track the movements of images.

Either by clicking and dragging or by double clicking, the image C is moved to display platform 140. The software program maximizes the amount of space in the display platform 140 available for two images (C and B) and reduces the image size of B to receive image C without overlapping. Likewise, image D is increased in size to compensate for the movement of image C from the display platform 120 (FIG. 5(B)). In this way, the display platforms 114, 120, 140 are integrated and can be utilized by an operator for multitasking without any overlapping of images.

Figure 6:
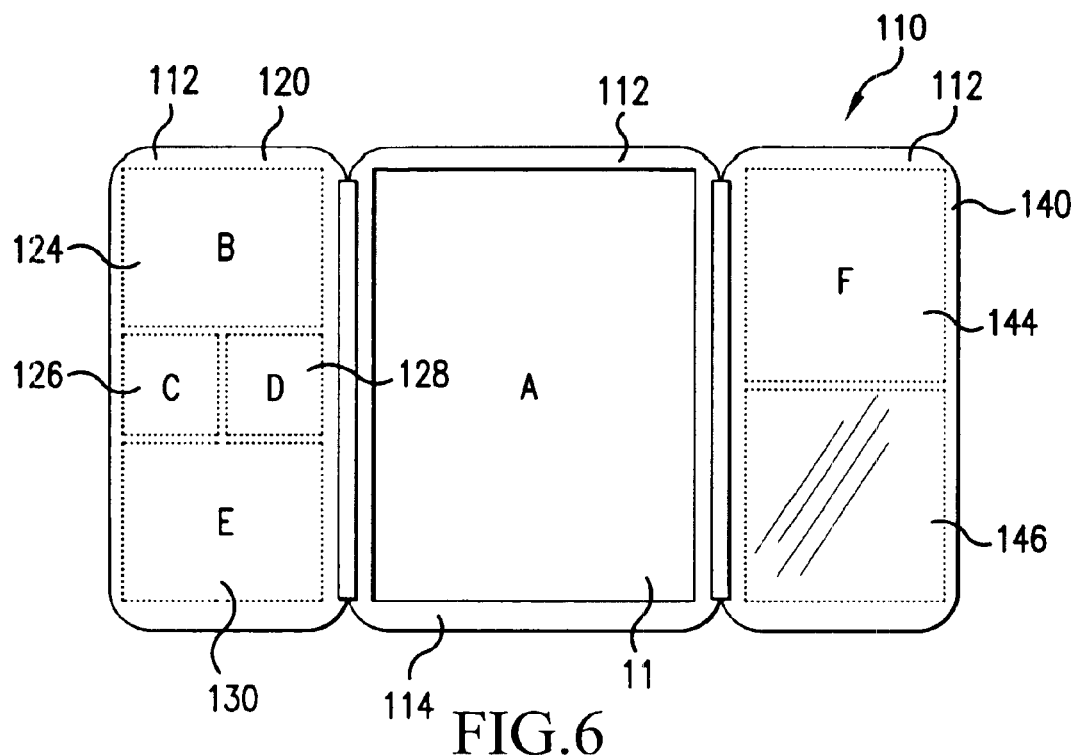
FIG. 6 is a front view of the computer monitor of FIG. 2.

It should be understood that the images on the auxiliary display platforms 120, 140 are maximized to take up all of the available screen space. Depending upon the number of opened desktop items, the images may be of varying sizes within each display platform, as shown in FIG. 6.

Figure 7:
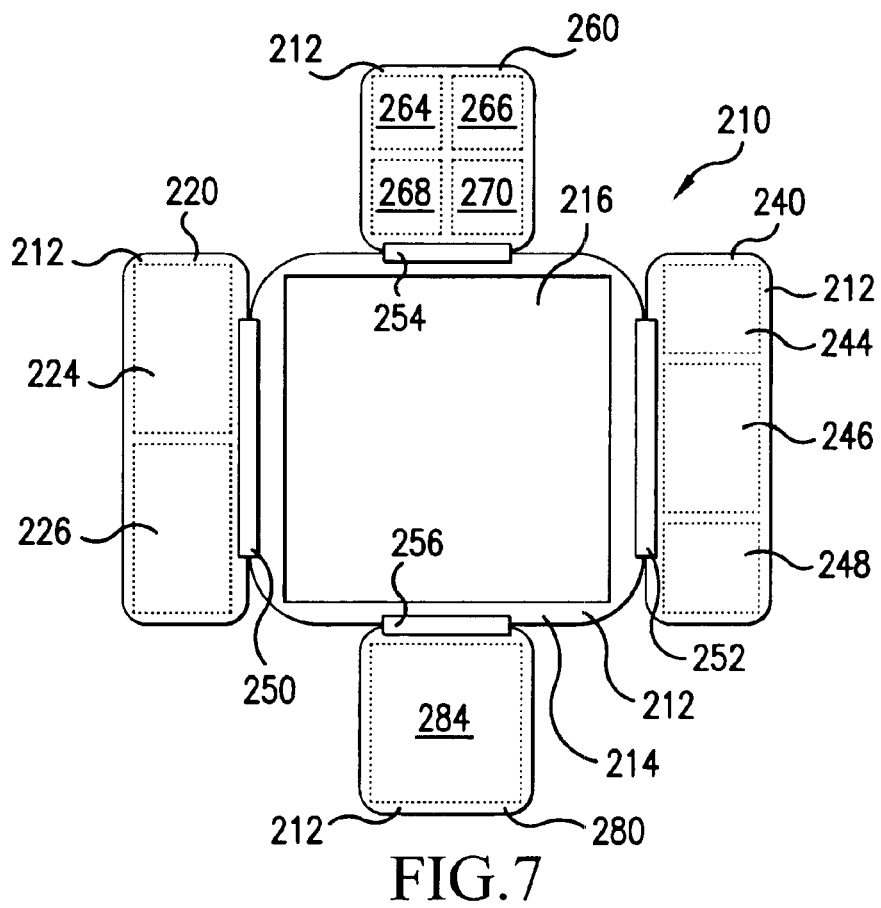
FIG. 7 is a front view of a computer monitor constructed in accordance with another exemplary embodiment of the invention.

FIG. 7 illustrates another monitor 210 which includes four auxiliary display platforms 220, 240, 260 and 280 positioned around and rotatably connected to a primary display platform 214, having a monitor screen 216, to make up a visual display 212. Two of the auxiliary display platforms 220, 240 are each positioned horizontally to the primary display platform 214 and take up generally one-fourth of the primary display platform 214. The other two auxiliary display platforms 260, 280 are positioned above and below the primary display platform 214. Each of the auxiliary display platforms 260, 280 takes up about one fourth of the primary display platform 214.

The auxiliary display platform 220 is rotatably connected to the primary display platform 214 by a hinge 250. The auxiliary display platform 240 is rotatably connected to the primary display platform 214 by a hinge 252, while the auxiliary display platforms 260, 280 are each rotatably connected to the primary display platform 214 by, respectively, hinges 254, 256. By folding each of the auxiliary display platforms 220, 240, 260, 280 over the primary display platform 214, the monitor screen 216, as well as the monitors screens on the auxiliary display platforms, are protected from the elements. As with previously described embodiments, the opening and closing of the auxiliary display platforms 220, 240, 260, 280 may activate and deactivate the display platforms. Further, as with previously described embodiments, images displayed on the auxiliary display platforms are maximized to take up the available space. As illustrated, images 224 and 226 take up the screen space on the display platform 220, images 244, 246, 248 share the screen space on the display platform 240, images 264–270 take up the screen space on the display platform 260, and image 284 takes up the screen space on the display platform 280.

FIGS. 8–10 illustrate another monitor 310, which includes a visual display device 312 formed by an auxiliary display platform 320 vertically above and rotatably connected to a primary display platform 314 having a monitor screen 316. A monitor screen 322 on the auxiliary display platform 320 is enabled to display multiple images, such as the images 324–330 shown. The display platforms 314, 320 are rotatably connected through a hinge 350 which allows an operator to close the auxiliary display platform 320 over the primary display platform 314 (FIG. 10) and open the display platform 320 to a desired angle from the display platform 314 (FIG. 9). As with previously described embodiments, the acts of opening and closing the auxiliary display platform 320 may activate and deactivate the electronics of the monitor 310.

Figure 11:
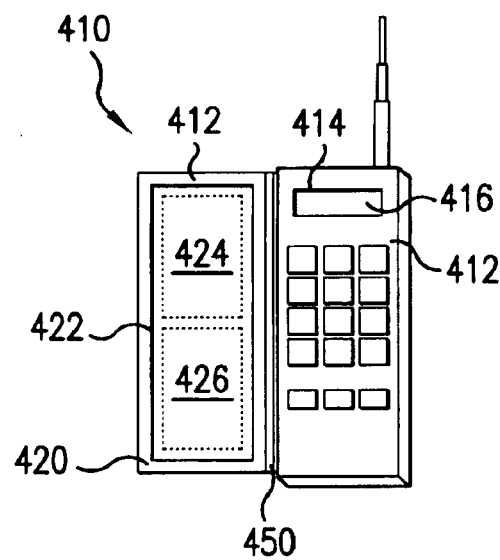
FIG. 11 is a front view of a telecommunications device constructed in accordance with another exemplary embodiment of the invention.
Figure 12:
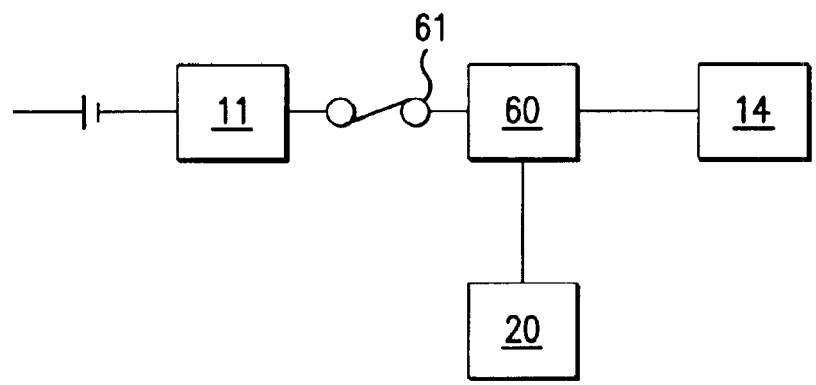
FIG. 12 is a partial circuit diagram illustrating an activation/deactivation switch in a closed position in accordance with an exemplary embodiment of the invention.
Figure 13:
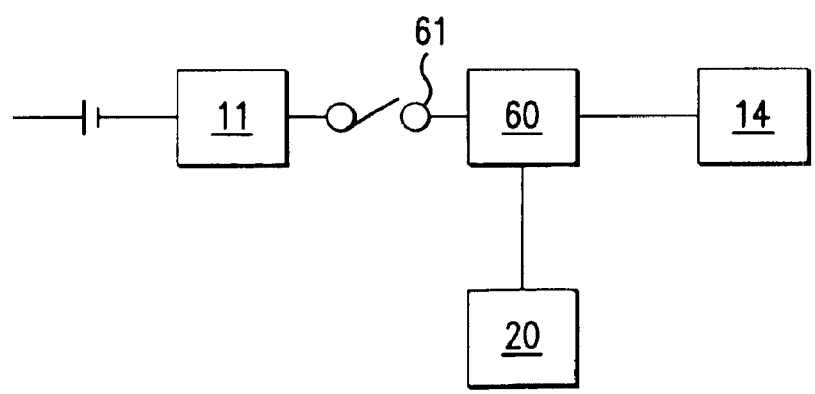
FIG. 13 illustrates the partial circuit diagram of FIG. 12 with the activation/deactivation switch in an opened position.

FIG. 11 illustrates a wireless telecommunications device 410, e.g., a cellular telephone, having a visual display device 412. The visual display device 412 includes a primary display platform 414 and an auxiliary display platform 420. The primary display platform 414 has a monitor screen 416 and the auxiliary display platform 420 has a monitor screen 422 capable of displaying multiple images, such as, for example, images 424, 426. The display platform 420 is rotatably connected to the display platform 414 through a hinge 450. As with other embodiments, the closing and opening of the auxiliary display platform 420 may deactivate and activate the display platforms 414, 420. Further, closing the auxiliary display platform 420 over the primary display platform 414 protects the monitor screens 416, 422 from the elements.

Referring to FIGS. 1, 8, 9, 12 and 13, now will be described an exemplary mechanism for activating and deactivating a portion of the electronics of a computer system such as the computer system 5. An activation/deactivation mechanism 60 is schematically shown as a button or tab on a front surface of the primary display platform 14. The mechanism 60 may take any form suitable for opening and closing an electrical or optical circuit.

When the mechanism 60 is in the undepressed state (FIG. 12), a switch 61 is dosed, thus completing a circuit from a power source, through the processing unit 11, and activating the display platforms 14, 20. When the auxiliary display platform 20 is folded over the primary display platform 20, the weight of the auxiliary display platform 20 depresses the mechanism 60. Depression of the mechanism 60 opens the switch 61 (FIG. 13), thus opening the circuit between the processing unit 11 and the display platforms 14, 20 which deactivates the display platforms.

Obviously, a similar activation/deactivation mechanism can be employed in the embodiments having more than one auxiliary display mechanism. More than one activation/deactivation mechanism may be utilized, one for each auxiliary display mechanism. Each mechanism may selectively activate/deactivate a single auxiliary display platform, with one of the mechanisms serving to activate/deactivate one of the auxiliary display platforms and the primary display platform. Additionally, the activation/deactivation mechanism may reside on the auxiliary display platform(s) instead of the primary display platform. Also, a small motor 70 (FIG. 1) may be connected with the hinge(s) and adapted to include a memory function such that the display platforms can be opened to a preset location based upon an input location. In this way, an operator can start up the hinge motor 70, which will rotate the display platforms from a closed position to a preselected opened position.

While the foregoing has described in detail preferred embodiments know at the time, it should be readily understood that the invention is not limited to the disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A computer monitor comprising:
    a primary display platform having a display screen;
    at least one auxiliary display platform having a display screen; and
    at least one hinge rotatably connecting said at least one auxiliary display platform to said primary display platform, such that said at least one auxiliary display platform can be operated at a variety of angles relative to said primary display platform, to suit the ergonomic preferences of a user, wherein said at least one auxiliary display platform is optically connected to said primary display platform through said at least one hinge.

2. The computer monitor of claim 1, wherein said at least one auxiliary display platform is sized and shaped to cover at least a portion of said display screen of said primary display platform in a closed position.

3. The computer monitor of claim 2, wherein said at least one auxiliary display platform is sized and shaped to cover all of said display screen of said primary display platform in said closed position.

4. The computer monitor of claim 1, further comprising at least one activation/deactivation mechanism for turning on and turning off the display screens of said display platforms.

5. The computer monitor of claim 4, wherein said at least one activation/deactivation mechanism is adapted for tuning on said display screens through rotation of said at least one auxiliary display platform from a closed position to an open position and turning off said display screens through rotation of said at least one auxiliary display platform from said open position to said closed position.

6. The computer monitor of claim 4, wherein said at least one activation/deactivation mechanism is positioned on a front surface of said primary display platform.

7. The computer monitor of claim 1, comprising a first said auxiliary display platform rotatably connected to said primary display platform with a horizontally-directed hinge.

8. The computer monitor of claim 7, comprising a second said auxiliary display platform rotatably connected to said primary display platform with a second horizontally-directed hinge.

9. The computer monitor of claim 8, wherein said first and second auxiliary display platforms are sized and shaped to cover at least a portion of said display screen of said primary display platform in a closed position.

10. The computer monitor of claim 1, comprising a first said auxiliary display platform rotatably connected to said primary display platform with a vertically-directed hinge.

11. The computer monitor of claim 10, comprising a second said auxiliary display platform rotatably connected to said primary display platform with a second vertically-directed hinge.

12. The computer monitor of claim 11, comprising a third said auxiliary display platform rotatably connected to said primary display platform with a second horizontally-directed hinge.

13. The computer monitor of claim 12, comprising a fourth said auxiliary display platform rotatably connected to said primary display platform with a second horizontally-directed hinge.

14. The computer monitor of claim 13, wherein said first, second, third and fourth auxiliary display platforms are sized and shaped to cover at least a portion of said display screen of said primary display platform in a closed position.

15. The computer monitor of claim 1, wherein said primary display platform and said at least one auxiliary display platform are integrated to inhibit overlapping of any display images.

16. The computer monitor of claim 1, further comprising:
    a motor for selectively rotating said at least one auxiliary display platform relative to said primary display platform between an open position and a closed position.

17. A computer system comprising:
    a processing unit;
    a primary display platform, with a display screen, electrically connected with said processing unit;
    at least one auxiliary display platform having a display screen; and
    a hinge rotatably connecting said at least one auxiliary display platform to said primary display platform, such that said at least one auxiliary display platform can be operated at a variety of angles relative to said primary display platform, to suit the ergonomic preferences of a user, wherein said at least one auxiliary display platform is optically connected to said primary display platform through said hinge.

18. The computer system of claim 17, wherein said at least one auxiliary display platform is sized and shaped to cover at least a portion of said display screen of said primary display platform in a closed position.

19. The computer system of claim 18, wherein said at least one auxiliary display platform is sized and shaped to cover all of said display screen of said primary display platform in said closed position.

20. The computer system of claim 17, wherein said primary display platform and said at least one auxiliary display platform are integrated to inhibit overlapping of any displayed images.

21. The computer system of claim 20, further comprising a computer generated program which maximizes an amount of available space for one or more images to be displayed on said primary display platform and said at least one auxiliary display platform without allowing for an overlapping between any of said displayed images.

22. The computer system of claim 17, further comprising at least one activation/deactivation mechanism for turning on and turning off the display screen of said display platforms, said mechanism being positioned on at least one of said display platforms.

23. The computer system of claim 22, wherein said at least one activation/deactivation mechanism is adapted for tuning on said display screens through rotation of said at least one auxiliary display platform from a closed position to an open position and shutting off said display screens through rotation of said at least one auxiliary display platform from said open position to said closed position.

24. The computer system of claim 23, wherein one said mechanism is positioned on a front surface of said primary display platform.

25. The computer system of claim 17, comprising a first said auxiliary display platform rotatably connected to said primary display platform with a horizontally-directed hinge.

26. The computer system of claim 25, comprising a second said auxiliary display platform rotatably connected to said primary display platform with a second horizontally-directed hinge.

27. The computer system of claim 26, wherein said first and second auxiliary display platforms are sized and shaped to cover at least a portion of said display screen of said primary display platform in a closed position.

28. The computer system of claim 17, comprising a first said auxiliary display platform rotatably connected to said primary display platform with a vertically-directed hinge.

29. The computer system of claim 28, comprising a second said auxiliary display platform rotatably connected to said primary display platform with a second vertically-directed hinge.

30. The computer system of claim 29, comprising a third said auxiliary display platform rotatably connected to said primary display platform with a horizontally-directed hinge.

31. The computer system of claim 30, comprising a fourth said auxiliary display platform rotatably connected to said primary display platform with a second horizontally-directed hinge.

32. The computer system of claim 31, wherein said first, second, third and fourth auxiliary display platforms are sized and shaped to cover at least a portion of said display screen of said primary display platform in a closed position.

33. The computer system of claim 17, further comprising:
  a motor for selectively rotating said at least one auxiliary display platform relative to said primary display platform between an open position and a closed position.

34. A computer monitor comprising:
  a primary display platform having a display screen;
  at least one auxiliary display platform having a display screen;
  at least one hinge rotatably connecting said at least one auxiliary display platform to said primary display platform, such that said at least one auxiliary display platform can be operated at a variety of angles relative to said primary display platform, to suit the ergonomic preferences of a user; and
  a motor for selectively rotating said at least one auxiliary display platform relative to said primary display platform between an open position and a closed position.

35. The computer monitor of claim 34, wherein said at least one auxiliary display platform is sized and shaped to cover at least a portion of said display screen of said primary display platform in said closed position.

36. The computer monitor of claim 34, wherein in said at least one auxiliary display platform is electrically connected to said primary display platform through said at least one hinge.

37. A computer system comprising:
  a processing unit;
  a primary display platform, with a display screen, electrically connected with said processing unit;
  at least one auxiliary display platform having a display screen;
  a hinge rotatably connecting said at least one auxiliary display platform to said primary display platform, such that said at least one auxiliary display platform can be operated at a variety of angles relative to said primary display platform, to suit the ergonomic preferences of a user; and
  a motor for selectively rotating said at least one auxiliary display platform relative to said primary display platform between an open position and a closed position.

38. The computer system of claim 37, wherein said at least one auxiliary display platform is sized and shaped to cover at least a portion of said display screen of said primary display platform in said closed position.

39. The computer system of claim 37, wherein in said at least one auxiliary display platform is electrically connected to said primary display platform through said at least one hinge.

* * * * *